US007816042B2

(12) United States Patent
Huang

(10) Patent No.: US 7,816,042 B2
(45) Date of Patent: Oct. 19, 2010

(54) METAL-AIR BATTERY SYSTEM WITH PROGRAMMED-TIMING ACTIVATION

(75) Inventor: Wen C. Huang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 1041 days.

(21) Appl. No.: 11/546,707

(22) Filed: Oct. 13, 2006

(65) Prior Publication Data
US 2007/0031714 A1    Feb. 8, 2007

Related U.S. Application Data

(62) Division of application No. 10/431,661, filed on May 9, 2003, now Pat. No. 7,157,171.

(51) Int. Cl.
*H01M 8/20* (2006.01)
*H01M 6/32* (2006.01)

(52) U.S. Cl. .............................. 429/403; 429/61; 429/82

(58) Field of Classification Search ............. 429/12–13, 429/22–23, 27, 61, 82, 122–255
See application file for complete search history.

(56) References Cited

U.S. PATENT DOCUMENTS

| | | | |
|---|---|---|---|
| 4,118,544 A | 10/1978 | Przybyla et al. | |
| 4,139,679 A | 2/1979 | Appelby et al. | |
| 4,177,327 A | 12/1979 | Mathews et al. | |
| 4,189,526 A | 2/1980 | Gretzmeyer et al. | |
| 4,262,062 A | 4/1981 | Zatsky | |
| 4,490,443 A | 12/1984 | Ruch et al. | |
| 4,620,111 A | 10/1986 | McArthur et al. | |
| 4,913,983 A | 4/1990 | Cheiky | |
| 5,069,986 A | 12/1991 | Dwaokin et al. | |
| 5,116,695 A | 5/1992 | Rao et al. | |
| 5,166,011 A | 11/1992 | Rao et al. | |
| 5,191,274 A | 3/1993 | Lloyd et al. | |
| 5,196,275 A | 3/1993 | Goldman et al. | |
| 5,225,291 A | 7/1993 | Rao et al. | |
| 5,250,370 A | 10/1993 | Faris | |
| 5,318,861 A | 6/1994 | Harats et al. | |
| 5,415,949 A * | 5/1995 | Stone et al. | 429/63 |
| 5,418,080 A | 5/1995 | Korall et al. | |
| 5,569,551 A | 10/1996 | Pedicini et al. | |
| 5,615,717 A * | 4/1997 | Cheiky | 141/100 |
| 5,639,568 A | 6/1997 | Pedicini et al. | |
| 5,691,074 A | 11/1997 | Pedicini | |
| 6,773,842 B2 | 8/2004 | Liu et al. | |
| 6,864,018 B2 | 3/2005 | Huang et al. | |

* cited by examiner

*Primary Examiner*—Basia Ridley
*Assistant Examiner*—Jacob Buchanan

(57) ABSTRACT

This invention provides an actively controlled battery with a programmed-timing actuation capability. The battery comprises a first electrochemical assembly, at least a second electrochemical cell assembly electronically connected in parallel with the first assembly, and control means in control relation to the first assembly and the second assembly, wherein at least one of the assemblies comprises a metal-air cell comprising a cathode being isolated from outside air through a controllable air vent and at least one of the assemblies comprising an electrochemical cell comprising an anode active material being initially isolated from an electrolyte fluid through a control valve, with both the air vent and control valve being regulated by the control means in a programmed-timing fashion. The battery has an exceptionally long operating life and is particularly useful for powering microelectronic or communication devices such as mobile phones, laptop computers, and palm computers.

23 Claims, 12 Drawing Sheets

(a) Close (b) Open

METAL-AIR BATTERY SYSTEM WITH PROGRAMMED-TIMING ACTIVATION

This is a divisional of U.S. application Ser. No. 10/431,661, filed May 9, 2003, now U.S. Pat. No. 7,157,171.

BACKGROUND OF THE INVENTION

1. Field of the Invention

The present invention relates to a metal-air battery or fuel cell with a long operating life. In particular, this invention relates to a multiple-cell battery or fuel cell with the constituent metal-air cells being activated in a programmed-timing manner to achieve an extended operating life and better utilization of the capacity of individual cells.

2. Brief Description of the Prior Art

Metal-air batteries produce electricity by the electrochemical coupling of a reactive metallic anode to an air cathode through a suitable electrolyte in a cell. The air cathode is typically a sheet-like member, having one surface exposed to the atmosphere and another surface exposed to the aqueous electrolyte of the cell. During cell operation oxygen is reduced within the cathode while anode metal is oxidized, providing a usable electric current that flows through an external circuit connected between the anode and the cathode. The cathode must be permeable to air or oxygen but substantially impermeable to aqueous electrolyte, and must incorporate an electrically conductive element to which the external circuit can be connected. Commercial air cathodes typically contain active carbon, a finely divided hydrophobic polymeric material, a dissociation-promoting catalyst, and a metal screen as the conductive element. A variety of anode metals have been used or proposed for use in metal-air cells. However, zinc, lithium, aluminum, magnesium and alloys of these elements are considered especially advantageous due to their low cost, light weight, and ability to work with a variety of electrolytes.

For instance, a typical aluminum-air cell comprises a body of aqueous electrolyte, a sheet-like air cathode having one surface exposed to the electrolyte and the other surface exposed to air, and an aluminum alloy anode member (e.g. a flat plate) immersed in the electrolyte. There are two basic types of aqueous electrolytes for metal-air batteries: a neutral-pH electrolyte and a highly alkaline electrolyte. The neutral-pH electrolyte usually contains halide salts and, because of its relatively low electrical conductivity and the virtual insolubility of aluminum therein, is used for relatively low power applications. The highly alkaline electrolyte usually consists of NaOH or KOH solution, and yields a higher cell voltage than the neutral electrolyte.

In neutral-pH electrolyte, the cell discharge reaction may be written as:

$$4Al + 3O_2 + 6H_2O \rightarrow 4Al(OH)_3 \text{ (solid)}$$

In alkaline electrolyte, the cell discharge reaction may be written as:

$$4Al + 3O_2 + 6H_2O + 4KOH \rightarrow 4Al(OH)_4^- + 4K^+ \text{(liquid solution)},$$

which is followed, after the dissolved potassium (or sodium) aluminate exceeds a saturation level, by:

$$4Al(OH)_4^- + 4K^+ \rightarrow 4Al(OH)_3 \text{ (solid)} + 4KOH$$

In addition to the above oxygen-reducing reactions, there is also an undesirable, non-beneficial reaction of aluminum in both types of electrolyte to form hydrogen, as follows:

$$2Al + 6H_2O \rightarrow 2Al(OH)_3 + 3H_2 \text{ (gas)}.$$

The above equations and similar equations for other types of metal-air cells indicate that it is critically important to regulate the ingress of oxygen and the timing at which electrolyte is brought in contact with the anode. Once oxygen is admitted into a metal-air cell and the anode is in contact with an electrolyte, discharge reactions (including current leakage), anode passivation, and electrode corrosion could proceed regardless if the cell is being used or not to power an external device. This effectively reduces the useful battery life and makes inefficient use of the anode material.

Specifically, state-of-the-art metal-air batteries have been found to exhibit the following shortcomings:

(1) Severe "anode passivation" problem: When the battery is run under high load, large amounts of aluminum hydroxide accumulate on the aluminum anode surface blocking the further access of anode by the electrolyte. In the case of zinc-air cells, zinc oxide layers prevent further access of zinc anode by the electrolyte. Such an anode passivation phenomenon tends to prevent the remaining anode active material from contacting the electrolyte since the remaining anode material is now effectively coated or surrounded by a ceramic layer. Consequently, the electron-generating function ceases and the remaining active anode material can no longer be used (hence, a low-utilization anode). All metal anodes used in state-of-the-art metal-air batteries are known to suffer from the anode passivation problem to varying degrees.

(2) Severe self-discharge and current leakage problems: "Self-discharge" is due to a chemical reaction within a battery that does not provide a usable electric current. Self-discharge diminishes the capacity of a battery for providing a usable electric current. For the case of a metal-air battery, self-discharge occurs, for example, when a metal-air cell dries out and the metal anode is oxidized by the oxygen that seeps into the battery during periods of non-use. Leakage current can be characterized as the electric current that is supplied to a closed circuit by a metal-air cell even when air is not continuously provided to the cell. These problems also result in a low-utilization anode.

(3) Severe corrosion problem: Four metals have been studied extensively for use in metal-air battery systems: zinc (Zn), aluminum (Al), magnesium (Mg), and lithium (Li). Despite the fact that metals such as Al, Mg, and Li have a much higher energy density than zinc, the three metals (Al, Mg, and Li) suffer from severe corrosion problems during storage. Hence, Mg-air and Al-air cells are generally operated either as "reserve" batteries in which the electrolyte solution is added to the cell only when it is decided to begin the discharge, or as "mechanically rechargeable" batteries which have replacement anode units available. The presence of oxygen tends to aggravate the corrosion problem. Since the serious corrosion problem of Zn can be more readily inhibited, Zn-air batteries have been the only commercially viable metal-air systems. It is a great pity that high power or energy density metals like Al, Mg and Li have not been extensively used in a primary or secondary cell.

There is a need for a battery that can be used as an emergency power source at locations where electric supply lines do not exist. Such a battery must have a high energy capacity and a high power density and be capable of running for a long period of time under high load. There is also a need for a battery or fuel cell that can provide a much extended "talk time" and "stand-by" time for a mobile phone. A need also exists for a battery that can power a notebook computer for a much longer period of time (e.g., 12 hours being needed to last for a trans-Pacific flight). Due to their high energy-toweight ratio, safety of use, and other advantages, metal-air, and particularly zinc-air, batteries have been proposed as a preferred energy source for use in electrically-powered vehicles. However, just like aluminum-air cells, zinc-air batteries also suffer from the problem of "passivation", in this case, by the formation of a zinc oxide layer that prevents the remaining anode active material (Zn) from contacting the electrolyte.

A number of techniques have been proposed to prevent degradation of battery performance caused by zinc oxide passivation or to somehow extend the operating life of a metal-air battery. In one technique, a sufficient (usually an excessive) amount of electrolyte was added to allow most of the zinc to dissolve (to become Zn ion and thereby giving up the desired electrons). The large amount of electrolyte added significantly increased the total weight of the battery system and, thereby, compromising the specific energy density (energy per unit weight).

In a second approach, anodes were made by compacting powdered zinc onto brass current collectors to form a porous mass with a high surface/volume ratio. In this configuration, the oxide would not significantly block further oxidation of the zinc, provided that the zinc particles were sufficiently small. With excessively small zinc particles, however, zinc was rapidly consumed due to self-discharge and leakage (regardless if the battery is in use or not) and even more serious corrosion problems and, hence, the battery will not last long.

In a third approach, particularly for the development of metal-air batteries as a main power source for vehicle propulsion, focus has been placed on "mechanically rechargeable" primary battery systems. Such a system normally comprises a consumable metal anode and a non-consumable air cathode, with the metal anode being configured to be replaceable once the metal component therein is expended following oxidation in the current-producing reaction. These systems constituted an advance over the previously-proposed secondary battery systems, which have to be electrically charged for an extended period of time once exhausted, and require an external source of direct current.

Most of these mechanically rechargeable systems are quite complex in construction. For instance, the system disclosed in U.S. Pat. No. 4,139,679 (Feb. 13, 1979 to A. Appelby, et al.) contains an active particulate metal anode component freely suspended in an alkaline electrolyte, and a pump to keep the particulate metal anode in suspension and circulated between air cathodes. After discharge of the metal anode component, the electrolyte is then replaced with an electrolyte containing a fresh particulate metal anode component in suspension.

Mechanically rechargeable metal-air batteries with mechanically replaceable anodes have been further developed, e.g., in U.S. Pat. No. 5,196,275 (Mar. 23, 1993 to Goldman, et al.); U.S. Pat. No. 5,318,861 (Jun. 7, 1994 to Harats, et al.); and U.S. Pat. No. 5,418,080 (May 23, 1995 to Korall, et al.). These systems have been designed particularly for use in electric vehicle propulsion, since they facilitate quick recharging of the vehicle batteries simply by replacing the spent anodes, while keeping the air cathodes and other battery structures in place. This mechanical recharging, or refueling, may be accomplished in service stations dedicated to that purpose. However, it is necessary to provide metal-air battery cells that will repeatedly allow insertion and removal of the zinc anode elements for each charge/discharge cycle without causing wear and tear to the mechanically sensitive air electrode flanking each zinc anode.

Another approach to extending the discharge life of a metal-air battery is the "variable-area dynamic anode" method proposed by Faris (e.g., U.S. Pat. No. 5,250,370, Oct. 5, 1993). Such a battery structure includes electrodes, which are moved relative to each other during operation. The electrodes also have areas that are both different in size, with ratios that are variable. The battery structure includes a first electrode, which is fixed in a container. A second electrode is moved past the fixed electrode in the container and battery action such as discharge occurs between proximate areas of the first and second electrodes. A third electrode may be provided in the container to recharge the second electrode as areas of the second electrode are moved past the third electrode at the same time that other areas of the second electrode are being discharged at the first electrode. The ratio of the third electrode area to the first electrode area is much larger than 1, resulting in a recharge time that is much faster, thereby improving the recharge speed. However, this battery structure is very complicated and its operation could present a reliability problem.

Attempts to extend the operating life of a metal-air battery also include the utilization of a deferred actuated battery system, e.g., B. Rao, et al. (U.S. Pat. No. 4,910,102, Mar. 20, 1990; No. 5,116,695, May 26, 1992; No. 5,166,011, Nov. 24, 1992, and No. 5,225,291, Jul. 6, 1993) and J. Ruch, et al. (U.S. Pat. No. 4,490,443, Dec. 25, 1984). Intermittent transfer of electrolyte between cells and a reservoir was proposed by Flanagan (U.S. Pat. No. 5,472,803). The above-cited batteries proposed by Rao, et al. and by Flanagan have the following drawbacks: These batteries involve the operation of a complicated electrolyte delivery system. Further, the deferred actuated battery system proposed by Rao, et al. relied upon a manual actuation operation, not a programmed-timing one. No predetermined criterion or logic was employed to automatically determine if and when a cell should be actuated. The system was based on a single cell or a single cell assembly. Actuation was effected by introducing electrolyte into the anode chamber (not in a programmed fashion and not carried out in an automated manner). Furthermore, no "air admittance on demand" concept was utilized in these batteries; the cell was exposed to the outside air at all times.

In U.S. Pat. No. 5,691,074 (Nov. 25, 1997), Pedicini proposed a diffusion-controlled air vent containing isolating passageways that function to limit the amount of oxygen that can reach the oxygen electrodes when the fan is off and the internal humidity level is relatively constant. This isolation reduces the self-discharge and leakage or drain current of the metal-air cells. In U.S. Pat. No. 5,569,551 (Oct. 29, 1996) and No. 5,639,568 (Jun. 17, 1997), Pedicini, et al. proposed the use of an anode bag to limit self-discharge of the cell in an attempt to maintain the capacity of the cell. It was stated that, by wrapping the anode in a micro-porous membrane that is gas-impermeable and liquid-permeable, oxygen from the ambient air that has seeped into the cell must go through a solubility step before it can pass through the anode bag to contact and discharge the anode. However, this solubility step is often not a slow step particularly when the oxygen or air ingress rate into the cell is high. This anode bag provides only a moderately effective approach to reducing the self-discharge problem. This is achieved at the expense of making the cell structure very complicated.

A "restricted gas passageway" concept was proposed much earlier by Przybyla, et al. (U.S. Pat. No. 4,118,544, Oct. 3, 1978) to restrict gas access to the cathode by way of a very small aperture in the cell container, or an additional barrier layer placed within the layer. Oxygen diffusion-limiting membrane was used by Cretzmeyer, et al. (U.S. Pat. No. 4,189,526, Feb. 19, 1980) to improve the active life of a metal-oxygen cell. Several attempts were made to employ a switch or valve to regulate the flow of oxygen into a metal-air cell. Examples include U.S. Pat. No. 4,262,062 (Apr. 14, 1981 to Zatsky), No. 4,620,111 (Oct. 28, 1986 to McArthur, et al.), No. 5,191,274 (Mar. 2, 1993 to Lloyd, et al.), No 5,069,986 (Dec. 3, 1991 to Dwaorkin, et al.), and No. 4,913,983 (Apr. 3, 1990 to Cheiky). Mathews, et al. (U.S. Pat. No. 4,177,327, Dec. 4, 1979) also recognized the importance of intermittently switching on/off an air vent to a metal-air battery for an improved operating life. An electrical actuator is effected to open the air vent only when the battery is supplying electric power to a load. In this manner, the battery is open to the possibility of harsh ambient conditions such as very high or very low ambient relative humidity, prolonged carbon dioxide exposure, etc. However, in the batteries proposed by Mathews, et al. and others cited above, a switch or valve must be manually operated to turn on and off an air access vent and the timing at which this on/off operation is carried out must be determined by the user of the external device. Quite often, this user does not know if the battery in operation is running low in power and should be replaced or recharged immediately. Further, these prior-art batteries are each composed of an assembly of metal-air cells connected in series (e.g., in Mathews, et al., U.S. Pat. No. 4,177,327) and they do not address the issues of timing at which an individual cell assembly is actuated.

A particularly promising approach to the reduction of anode passivation and self-discharge problems and, hence, much enhanced battery operating life and better utilization of the anode material has been developed by the present applicant (W. C. Huang) and his colleague J. Liu ("Metal-Air Battery with an Extended Service Life," U.S. Pat. No. 6,773,842 issued on Aug. 10, 2004). This approach entails constructing a battery that has a control circuit and a plurality of metal-air cell assemblies that are electronically connected in parallel. Each cell assembly comprises a casing with a controllable air vent thereon and at least a metal-air cell inside the casing. The controllable air vent is closed during a battery storage period and is opened in response to a programmed signal in order to allow outside air to enter the assembly through the air vent to activate the operation of the corresponding cell assembly. The control circuit, including a sampling unit, a power control unit and a logic control unit, is capable of sensing the battery output voltage and sending programmed signals to open or close up the air vents at the same time or at different moments of time in a programmed fashion. This actively controlled battery has an exceptionally long operating life. In this approach, however, the anode was in physical contact with the electrolyte in each metal-air cell when the battery was fabricated. Anode corrosion could still occur in this type metal-air battery where the outside air was admitted when needed (hereinafter referred to as the "air admittance on demand" strategy).

Therefore, it is an object of the present invention to provide a smart battery that is composed of a multiplicity of metal-air cell assemblies that can be separately actuated in a programmed-timing fashion. Such a programmed-timing fashion could include a sequential fashion, in which the cell assemblies are actuated or switched on one after another. The actuation of a cell assembly is accomplished by turning on its corresponding electrolyte control valve in order for the anode in individual metal-air cells to receive the needed electrolyte (hereinafter referred to as "anode-electrolyte contact on demand" strategy).

Another object of the present invention is to provide a smart metal-air battery that makes use of both the "air admittance on demand" and "anode-electrolyte contact on demand" strategies.

It is still another object of the present invention to provide a battery that exhibits little or no anode passivation, self-discharge, current leakage, and/or anode corrosion problems.

A specific object of the present invention is to provide a metal-air battery that has a long storage life and a long operating life.

SUMMARY OF THE INVENTION

The present invention provides a multiple-cell battery comprising at least a first metal-air cell assembly and a second metal-air cell assembly electronically connected in parallel. However, there can be several cell assemblies or any desired number of cell assemblies in a battery. The first cell assembly comprises at least a metal-air cell (normally 1 to 20 cells connected in series), a casing that houses these cells, a controllable air vent on the casing that is closed during a battery storage period. In at least one of the cells, the anode is isolated from the electrolyte prior to the first operation of this cell, i.e. during the initial storage period. Preferably, the anode in all of the cells in this assembly is isolated from the electrolyte during the initial storage period. This isolation is accomplished by initially placing the anode and the electrolyte fluid in two separate compartments, preferably with an easily openable access door or valve inbetween these two compartments. In order to activate the operation of the first metal-air cell assembly and, hence, the first use of the battery, this fluid access door/valve is opened so that the electrolyte fluid is allowed to flow to physically contact the anode and the air vent is opened to allow outside air or oxygen to enter this cell assembly.

The second cell assembly (and the third, fourth, etc.) is similarly configured so that its access door and controllable air vent are both closed during a battery storage period. In response to a programmed signal, both the access door and the air vent are opened in order to allow the electrolyte fluid to come in physical contact with the anode and to allow outside air or oxygen to enter the assembly when needed to activate the operation of the second metal-air cell assembly. The battery also comprises control means for sending programmed signals to open up the first and second access doors (and third, fourth, etc.) and the first and second air vents (and third, fourth, etc.) at the same time or at different moments of time in a programmed fashion.

Inside any of the cell assemblies, it is possible to include one or more electrochemical cells that are not metal-air cells. These cells, metal-air cells or not, are preferably connected in series, but some of them can be connected in parallel.

Preferably, all the fluid access doors and air vents are closed when the battery is not in operation. Further preferably, the access doors and the air vents are each equipped with an electrically operated actuator means that operates to open or close the corresponding access door or air vent responsive to programmed signals from the control means. Optionally, the first access door and/or first air vent are designed in such a fashion that they can be opened manually and the succeeding valves and vents are opened automatically according to a programmed logic. The actuator can comprise an actuator element selected from the group consisting of a bi-metal device, a thermo-mechanical device, a piezo-electric device, a shape memory alloy, an electromagnetic element, or a combination thereof.

The control means comprises a sampling unit and a logic circuit to determine the timing at which an access door is opened and the timing at which an air vent is opened or closed. Preferably, the battery further comprises a power control unit to regulate the power input to the logic control unit.

Most preferably, the battery is capable of autonomously switching off the power input to other circuit elements than the sampling unit in order to conserve the battery power after the control unit determines that no opening or closing of any of the air vents is needed. The sampling unit, which is designed to draw a minimal amount of current, is allowed to stay on at all times.

The controllable air vents are preferably re-sealable and are re-closed responsive to programmed signals from the control means. Preferably, the second controllable air vent (and/or the third, fourth, etc.) and/or the second electrolyte valve (an/or the third, fourth, etc.) is/are opened when the voltage, current, or power output of the battery in operation drops below a predetermined low threshold valve. At least one of the controllable air vents is re-closed when a voltage, current or power output of the battery exceeds a predetermined high threshold valve.

In one preferred embodiment, the battery is so designed that the programmed fashion includes the mode of sequential timing at which the access doors and the air vents are opened in a sequential fashion.

The battery preferably further comprises a main casing to house all the cell assemblies. In this case, the main casing comprises a main air vent, which is closed during an initial battery storage period and is opened manually to begin the operation of the battery. It is preferably designed in such a way that the first air vent is at least slightly cracked open (and the first access door is also open) when this main air vent is opened for the first time. Most preferably, one of the air vents remains open (e.g., the first air vent) while the main air vent for the main casing remains closed during the initial battery storage period. In this manner, the first cell assembly becomes activated once the main air vent is opened. After this first step of manually opening the main air vent, the closing and opening operations of all the controllable air vents (including the first one) for the cell assemblies are to be dictated by the control means in a programmed fashion.

DESCRIPTION OF THE PREFERRED EMBODIMENTS

Figure 1A:
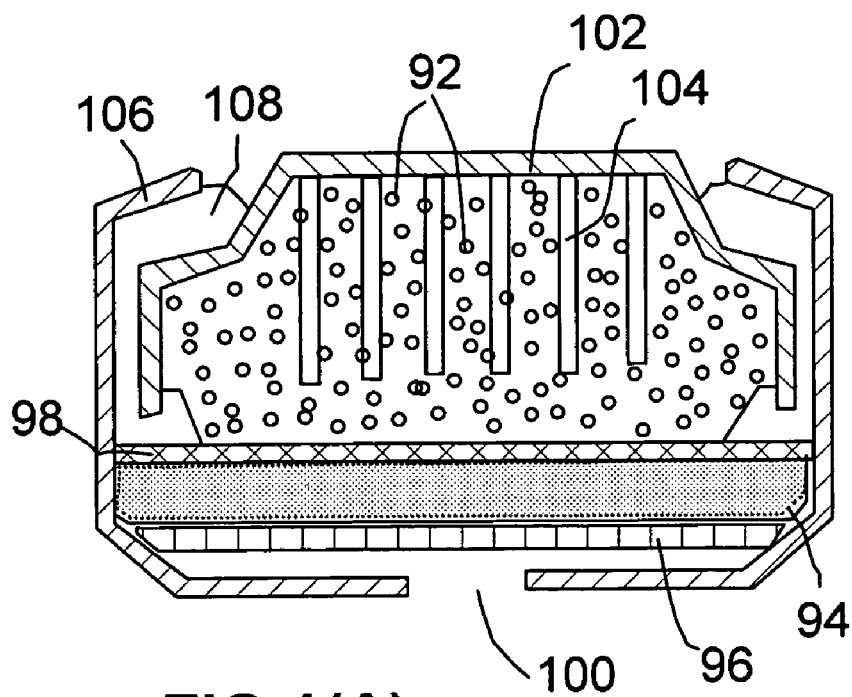
FIG. 1 (A) a prior-art button-type metal-air cell and (B) a button-type metal-air cell wherein the anode is isolated from the electrolyte fluid and air prior to the first use of this cell.

An electrochemical cell typically includes a cathode, an electrolyte in ionic contact with the cathode, and an anode in physical contact with the electrolyte. FIG. 1(A) shows one example of an electrochemical cell, which is a button-type metal-air battery. This prior-art battery contains an air access port or aperture 100 and an air-diffusion membrane 96 through which oxygen may enter the cell through a porous cathode 94 (which preferably contains some electro-catalyst) and a separator 98. In FIG. 1(A), an anode 92 is shown to be in the form of fine metal particles dispersed in an electrolyte solution. Anode current collectors 102, 104 are in electronic contact with the anode 92. An insulating gasket 108 is positioned between the anode current collector 102 and a steel casing 106. This and other similar types of prior-art metal-air cells are characterized in that (a) the air access port stays open at all times and readily accessible by the surrounding air and (b) the active anode material (e.g., zinc or aluminum powder) is already in contact with an electrolyte fluid. In these cells, whether the battery is in use or not, problems such as anode corrosion, passivation, and current leakage take place in these cells.

Figure 1B:
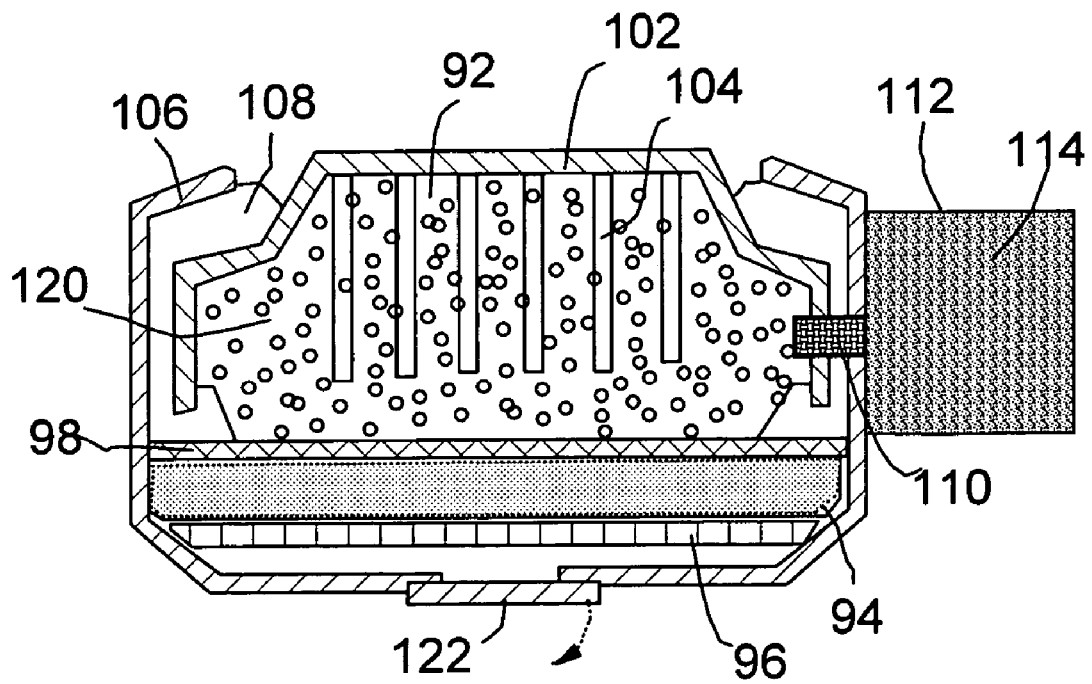

FIG. 1(B) schematically shows an improved metal-air cell configuration wherein the anode chamber 120 contains dry anode active material powder 92 only, with no liquid electrolyte being present during the initial storage period or prior to the first use of this cell. Instead, the electrolyte solution 114 stays in a separate chamber 112 initially, which is isolated from the anode chamber 120. In order to activate the first use of the cell, a valve or electrolyte fluid access door 110 is opened to allow the fluid to enter the anode chamber in which the electrolyte fluid is mixed with the active anode material powder. During the initial storage period, an air access vent 122 may be used to seal the cell from the surrounding air. This vent can be opened manually or automatically when the operation of this cell is desired. This type of improved metal-air cell may be incorporated as a part of the presently invented actively controlled or "smart" battery.

Figure 2A:
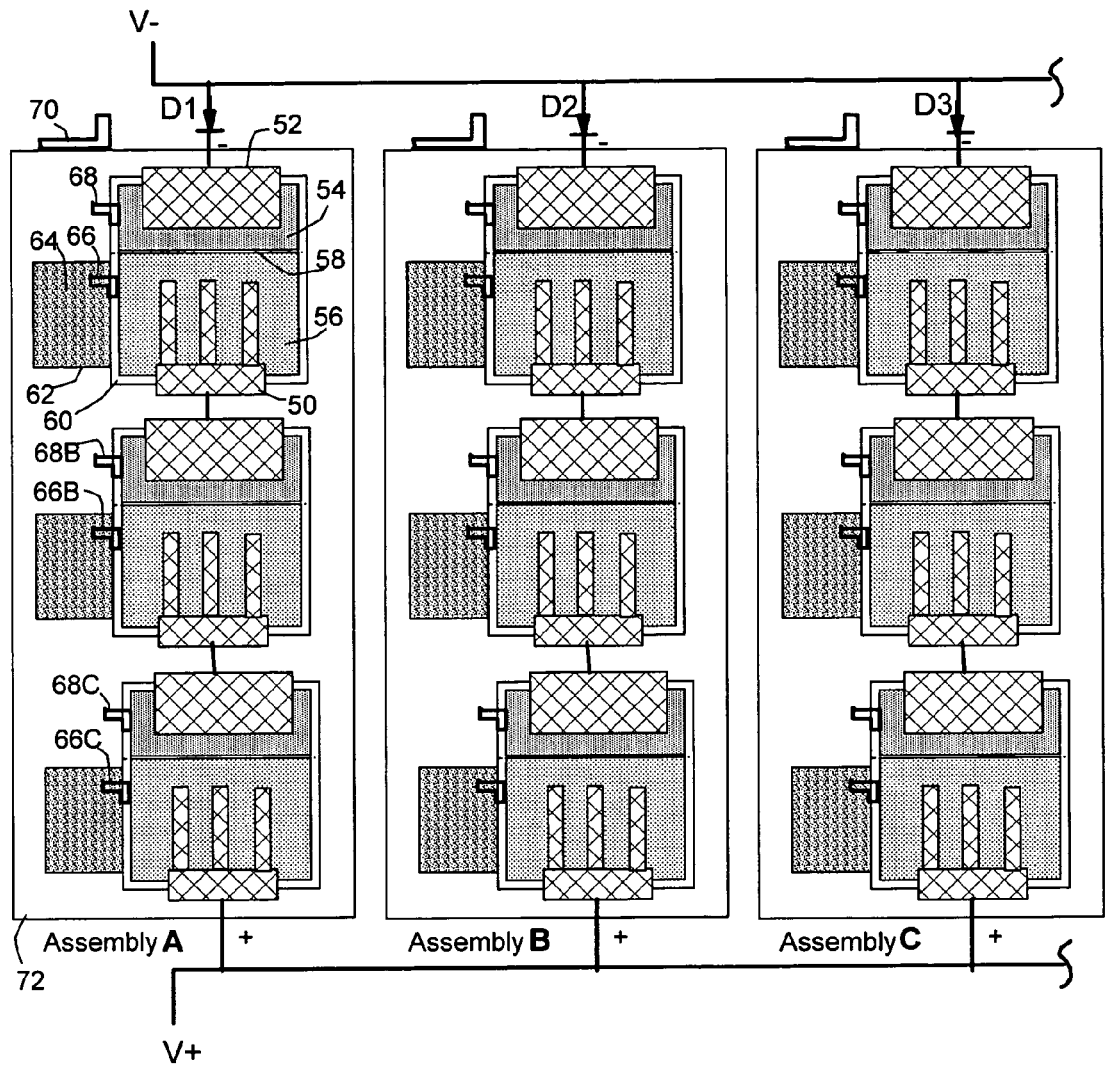
FIG. 2 (A) Schematic of a battery composed of a plurality of metal-air cell assemblies (e.g., Assemblies A, B, and C) connected in parallel wherein each assembly is composed of a plurality of electrochemical cells (3 metal-air cells indicated) connected in series; (B) Schematic of another battery composed of six cell assemblies.
Figure 2B:
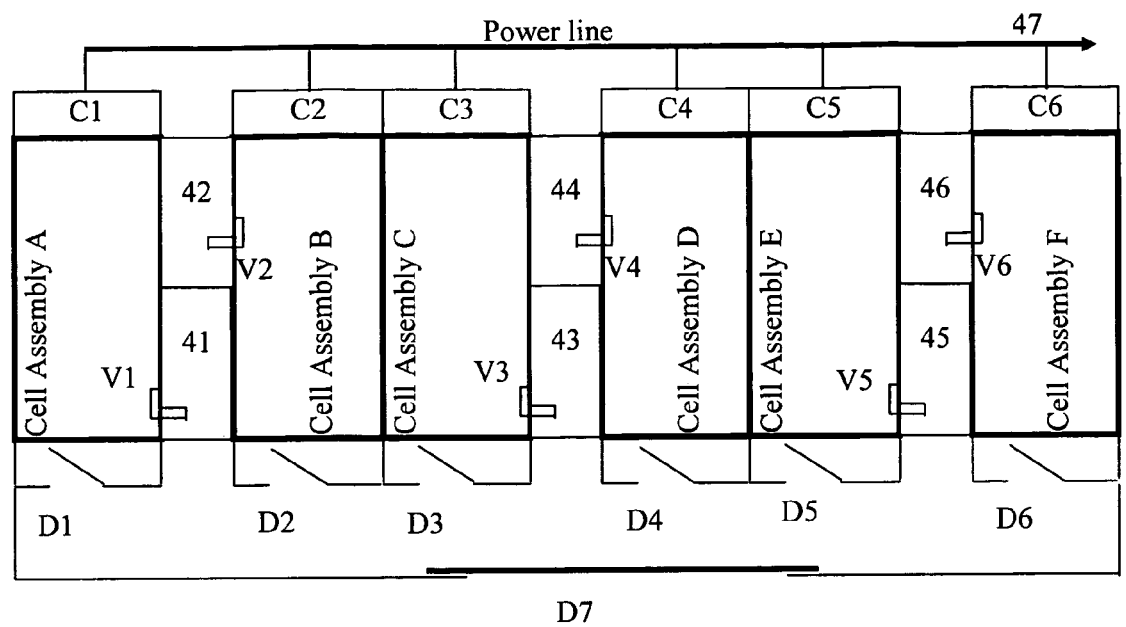
Figure 6:
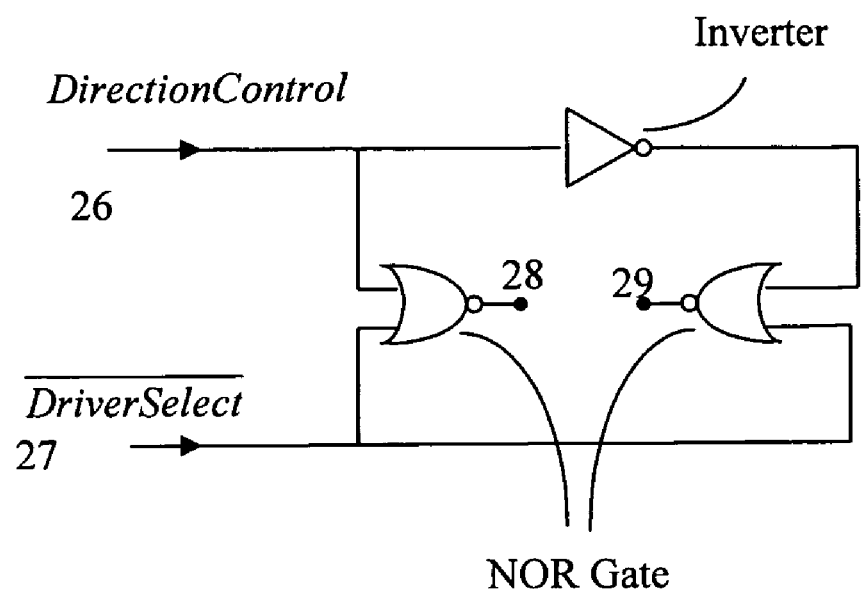
FIG. 6 Schematic of a driver unit.

As schematically shown in FIG. 2(A) and FIG. 2(B), a preferred embodiment of the present invention is a battery that is composed of a plurality of electrochemical cell assemblies that are, preferably, electrically connected in parallel (3 assemblies, A, B, and C being indicated in FIGS. 2(A) and 6 in FIG. 2(B)). Each cell assembly includes at least a metal-air cell and can include a number of cells connected in series (as indicated in FIG. 2(A) as an example), in parallel, or both. Most preferably, each assembly is composed of a desired number of metal-air cells that are connected in series. However, an assembly is allowed to optionally contain an electrochemical cell that is not a metal-air cell. The number of cells inside an assembly depends upon the battery output voltage and maximum current desired. For instance, 3 metal-air cells (each providing 1.2 volts/1 amp) connected in series provide a battery output voltage of 3.6 volts/1 amp. Although it is most preferred that the cell assemblies are connected in parallel if more current is needed, some cell assemblies may be allowed to be connected in series if higher voltage is needed.

Preferably each cell assembly comprises at least one metal-air cell (typically 2 to 10 metal-air cells) and a casing (e.g., 72 for Assembly A in FIG. 2(A)) to house all the cells in this assembly. The casing contains thereon a controllable air vent (e.g., 70 for Assembly A in FIG. 2(A) and V1 through V6 for cell assemblies A through F, respectively, in FIG. 2(B)) that is closed during a battery storage period and is opened in response to a programmed signal in order to allow outside air or oxygen to enter the metal-air cells through this air vent to activate the operation of this metal-air cell assembly. This constitutes the "air admittance on demand" approach. Preferably, the air vent of the first assembly to be used (e.g., 70 for Assembly A) can be opened manually in order to activate this first assembly of the battery, provided that no auxiliary battery is present to automatically open this air vent. In FIG. 2(A), each metal-air cell has an air access port, aperture, or vent (e.g., 68, 68B, and 68C), which may stay open at all times. Optionally, these vents for individual metal-air cells and/or the air vent for an assembly (e.g. 70 for Assembly A) may be switched on and off in a programmed fashion.

At least two (typically more than 2) similarly configured cell assemblies are packed together and housed inside a main casing to form a complete battery (e.g., 6 cell assemblies are shown in FIG. 2(B)). This main casing optionally has a main air vent, which is preferably closed during a battery storage period (e.g., prior to the first usage of this battery), but is easily opened at the start of the battery operation. Preferably this main air vent is re-sealed when the battery is not in use.

Each individual metal-air cell shown in FIG. 2(A) has a casing 60 containing an anode active material 56 (e.g., in the form of metal powder) and porous air cathode 54 separated by a membrane 58. The anode current collector 50 is in electronic contact with the anode active material 56 while the cathode current collector 52 is in contact with the cathode 54. An electrolyte fluid reservoir or compartment (e.g., 62) is in supply relation to the anode active material 56 through a valve 66, which remains closed during the initial storage period. The electrolyte valves (e.g., 66, 66B, 66C) for individual metal-air cells in the assembly to be activated first (e.g., Assembly A) may be manually opened or automatically opened to begin the operation of the battery. Preferably, individual electrolyte valves in other assemblies (e.g., B, C, etc.) are opened in a programmed fashion (following the "anode-electrolyte contact on demand" approach). The electrolyte fluid 64 may comprise an electrolyte solution (e.g., KOH or NaOH in water). The electrolyte fluid 64 may comprise just water, provided that the dry anode powder 56 is premixed with a dry electrolyte powder ingredient (e.g., dry NaCl or KCl). When water is allowed to flow through the valve (e.g., 66, 66B, or 66C) to come in contact with the mixture of anode and electrolyte powders, the electrolyte powder is dissolved in water to form a complete electrolyte solution.

Figure 3:
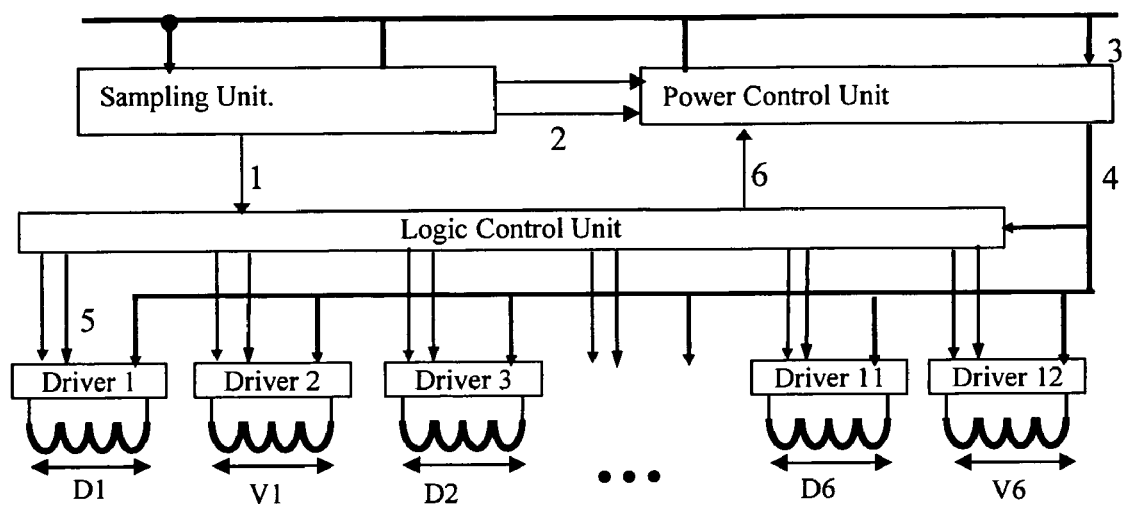
FIG. 3 Schematic of a control unit used in the battery of FIG. 2(A) or FIG. 2(B).

A preferred embodiment for the present invention is to allow cells in one assembly to share one electrolyte reservoir. As an example to illustrate the preferred embodiment, the presently invented battery consists of a main body (FIG. 2(A) or FIG. 2(B)) and its electronic control unit (FIG. 3). Six electrochemical cell assemblies, A through F, and their associated components are shown to constitute the main body (see FIG. 2(B)). These associated components include six respective circuitries, C1-C6 which may simply be diodes, as shown in FIG. 2(A). These diodes serve to protect the battery just in case any cell assembly is broken to become a short circuit. They may also be voltage-regulating circuits that serve to condition or adjust the output voltage. Six controllable air vents D1-D6, which are driven by their respective drivers (e.g., electromagnetic actuator devices) act as access paths for outside air. Six electrolyte fluid compartments, 41-46 supply cell assemblies, A-F, respectively, with an electrolyte fluid when their respective controllable electrolyte valves, V1-V6 are opened. An optional air vent D7, which may simply be a seal, is a main entrance for air. The seal, air vents and electrolyte valves preferably can be readily opened manually and further preferably are re-sealable should users prefer to have a total control of their battery. Each cell assembly is composed of at least one metal-air cell (but could be several basic metal-air cells connected in series, in parallel, or a combination, depending on how high the battery voltage or current is needed). Some of these cells could include other types of electrochemical cells, but at least one is a metal-air cell in one cell assembly. The negative poles of the diodes are connected together as the negative pole of the whole battery and are labeled as V− in FIG. 2(A). All the air cathodes of the six cell assemblies are connected together as the battery positive pole labeled as V+. The poles V+ and V− together are simply labeled as power line 47 in FIG. 2(B).

It may be noted that there are at least two variations of the actively controlled battery in the present invention: one being based solely on the "anode-electrolyte contact on demand" approach and the other on a combination of the "anode-electrolyte contact on demand" approach and the "air admittance on demand" approach. In the former case, the control means (to be described later) operates to open up the electrolyte access doors or valves in a programmed fashion. In the latter case, the control means operates to open the electrolyte access valves and to open and close the air vents in a programmed fashion.

The battery also comprises a control means for sending programmed signals to open the electrolyte valve and to open or close up the air vents at the same time or at different moments of time in a programmed fashion (including a sequential fashion). Typically, the instant of time at which a controllable air vent for a cell assembly is opened for the first time is different from the instants of time at which the air vents for other cell assemblies are opened for the first time. The most ideal situation is to activate an assembly only when the assembly is needed to contribute to the provision of power by the battery to an external load (a device or appliance such as a mobile phone or lap-top computer). Hence, it is desirable to open up the first vent (e.g., D1) to allow oxygen to enter all the metal-air cells in the first cell assembly (e.g., Assembly A) and first valve (e.g. V1) to allow electrolyte to flow into all the cells in the assembly, thus activate the first assembly when a battery is to be used for the first time. In a continuous usage situation, it is desired that most, if not all, of the power in this first cell assembly is fully utilized before a second cell assembly is activated by opening up the second air vent and electrolyte valve. When not in use, the second and other cell assemblies preferably are isolated from outside air or oxygen. Once air is admitted into a metal-air cell, undesirable effects such as self-discharge, oxidation and passivation would proceed to some extent regardless if the battery is being used or not. It is therefore highly advantageous not to expose a metal-air cell to oxygen and/or not to allow the active anode material to come in physical contact with an electrolyte fluid until this cell is needed to help in powering an external device. The present battery is designed to realize this goal. It may be noted that the battery may contain an additional electrochemical cell assembly that contains no metal-air cell. This additional assembly is preferably connected in parallel with other cell assemblies.

Electronic devices such as laptop computers, palm computers and mobile phones are often subject to an intermittent use condition, i.e. they are used for a while, switched off, and then switched on again after a period of dormant time. In the case of an intermittent battery use, the air vents to those already-activated metal-air cells are preferably re-sealed to avoid an excessive self-discharge (once air is admitted into a cell, some degree of self-discharge is un-avoidable, but re-sealing helps to alleviate this problem). These controllable air vents for different cell assemblies may be re-closed all at the same time or at different times when the external device no longer draws any current from the battery. The presently invented battery is capable of automatically performing the re-sealing steps in a programmed fashion.

Preferred Structure of the Battery:

FIG. 3 schematically shows a preferred structure of the electronic control unit of the battery. It is made up of a sampling unit, a power control unit, a logic control unit, and six drivers for the six respective actuators. The actuators shown here are electromagnetic devices that can undergo sliding or rotational motions to open/close the six respective controllable fluid valves and/or air vents. However, there are a wide variety of actuators that can be used to practice the present invention. For instance, an actuator element may be selected from the group consisting of a bi-metal device, a thermo-mechanical device, a piezo-electric device, a shape memory alloy, or a combination thereof. Connection 1 is for high and low limit signals from the sampling unit to the logic control unit. Connection 2 is for the control driving signals from the sampling unit to the power control unit, which has a power switch function. Connection 3 connects the positive and negative poles of the battery leads to the power control unit. Connection 4 feeds the output of the power control unit, through the power lines of the battery, to the logic control unit and all the drivers for providing power thereto. Connection 5 (with two connecting wires forming a set per driver) is for the control signals from the logic control unit to a driver. There are two drivers per cell assembly: air vent driver (e.g., D1) and electrolyte fluid valve driver (e.g., V1). Each air vent driver drives its corresponding actuator to open or close the air vent while each electrolyte valve driver drives its actuator to open the electrolyte valve. It is not necessary to re-close the electrolyte fluid valve once opened.

Figure 4:
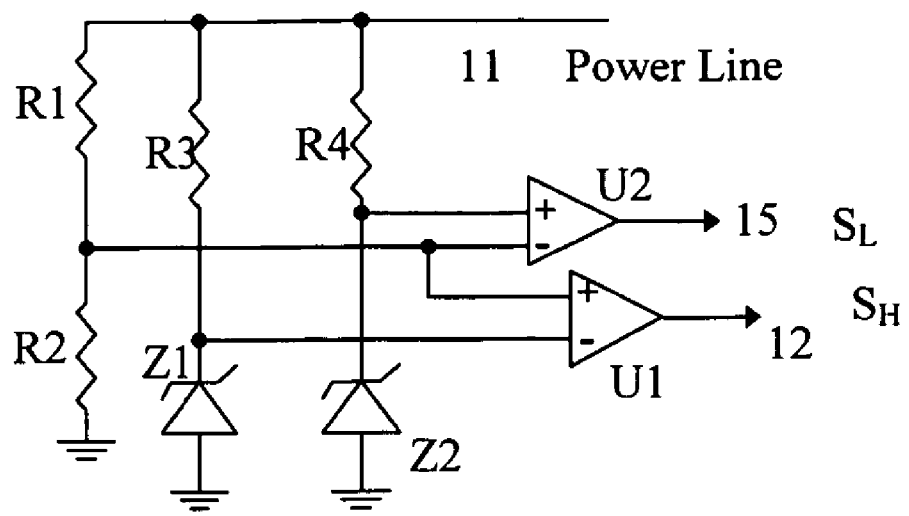
FIG. 4 Schematic of a sampling unit.

A circuit design for the sampling unit, shown in FIG. 4, consists of sampling resistors R1 and R2, reference circuits R3 and Z1, and R4 and Z2, and comparators U1 and U2. Terminal 12, the $S_H$ signal, and terminal 15, the $S_L$ signal, representing the voltage change of the battery, lead to the terminals $S_H$ and $S_L$ in FIG. 7. Terminal 11 is a power line that is connected to terminal 21 of the power control unit, schematically shown in FIG. 5.

Figure 5:
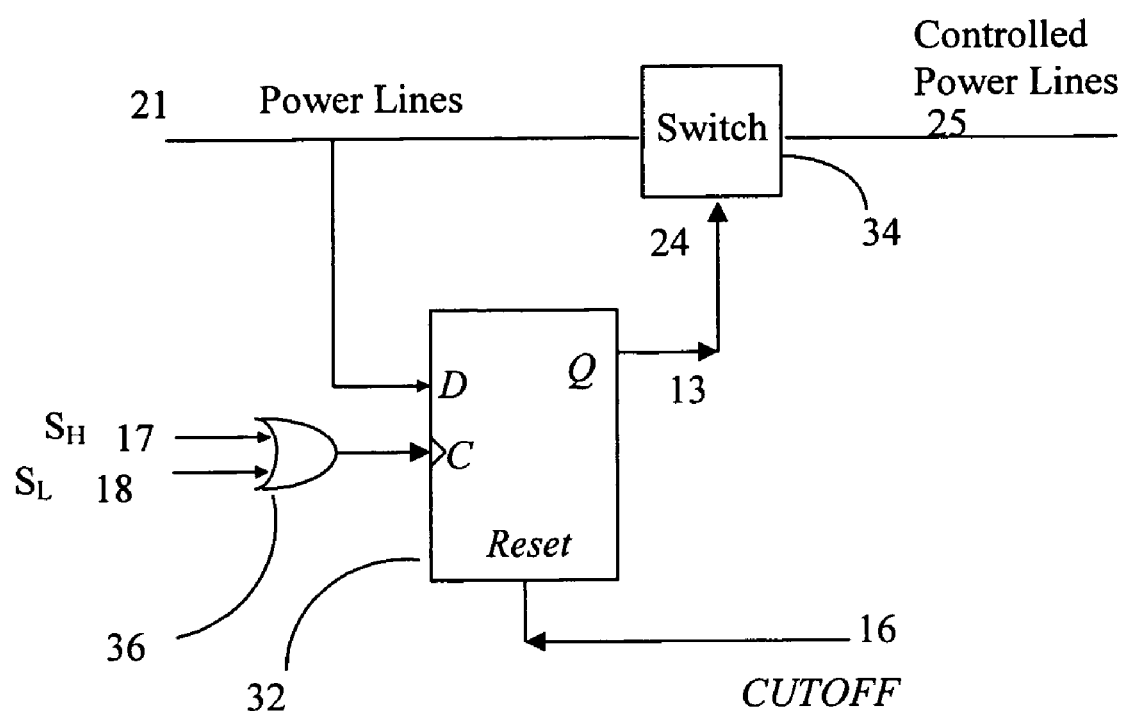
FIG. 5 Schematic of a power control unit.

The power control unit in FIG. 3 is further illustrated in FIG. 5. It consists of an OR gate 36, a switch 34 and a type D flip-flop 32. The switch can be a mechanical contact relay, a solid-state relay, or any other switch device driven by electricity. Shown in FIG. 5 is a switch constructed with MOS P-channel and N-channel enhancement mode devices in a single monolithic structure. A single control signal 24 is required for the switch. Both the p and the n device in the switch are biased on or off simultaneously by the control signal. Terminal 21 is the power line from the sampling unit shown in FIG. 4. The D-type flip-flop 32 has Data (D), Reset, and Clock (C) as input terminals and Q as output. A high level at the Reset input clears the output Q regardless of the level of the other input. When Reset is inactive (low), data at the D input are transferred to the outputs only on the positive-going edge of the clock pulse. Data at the D input may be changed without affecting the level at the output. Table 1 shows the truth table of a type D flip-flop. Terminal 24 accepts the actuating signal from the type D flip-flop 32 to actuate the switch for connecting or disconnecting the power supply from the battery. Terminal 25 indicates the power line from the switch to the logic control unit and all the drivers (see connection 4 in FIG. 3). Terminal 13 is for the driving signal that is connected to terminals 24 of the switch. Terminal 16 connected to the Reset input of the flip-flop accepts the "CUTOFF" signal from the logic control unit in FIG. 7 to reset the flip-flop. Terminals 17 and 18 accept the $S_L$ and $S_H$ signals from the sampling unit to actuate the switch for connecting or disconnecting the power supply from the battery.

TABLE 1

Truth table of a type D flip flop.

| Inputs | | | Outputs |
|---|---|---|---|
| Reset | Data | Clock* | Q |
| 1 | X | X | 0 |
| 0 | 1 | 0 → 1 | 1 |
| 0 | 0 | 0 → 1 | 0 |
| 0 | X | 1 → 0 | Q (No Change) |

X = Don't Care;
*Level Change

FIG. 3 shows twelve drivers, labeled Drivers 1 through 12, preferably having the configuration shown in FIG. 6. Each driver, which provides electric current to an actuator unit through terminals 28 and 29, consists of two NOR gates and an inverter. Terminal 27 connects to the signal $\overline{\text{DriverSelect}}$, an Enable control signal in the Driver Unit. When it is at a high electric voltage level (H), no current flows through terminal 28 and 29, regardless of the Direction Control signal in terminal 26. When $\overline{\text{DriverSelect}}$ is at a low electric voltage level (L), the working status of the transistors depends on the voltage level of the Direction Control. If Direction Control is at L, then terminal 28 is at a high voltage level (H) and terminal 29 is at L. Table 2 summarizes the operation conditions of driver units.

TABLE 2

Switching logic.

| $\overline{\text{DriverSelect}}$ | Direction Control | 28 | 29 | Current |
|---|---|---|---|---|
| H | X | L | L | No current |
| L | H | H | L | 28 → 29 |
| L | L | L | H | 29 → 28 |

Figure 7:
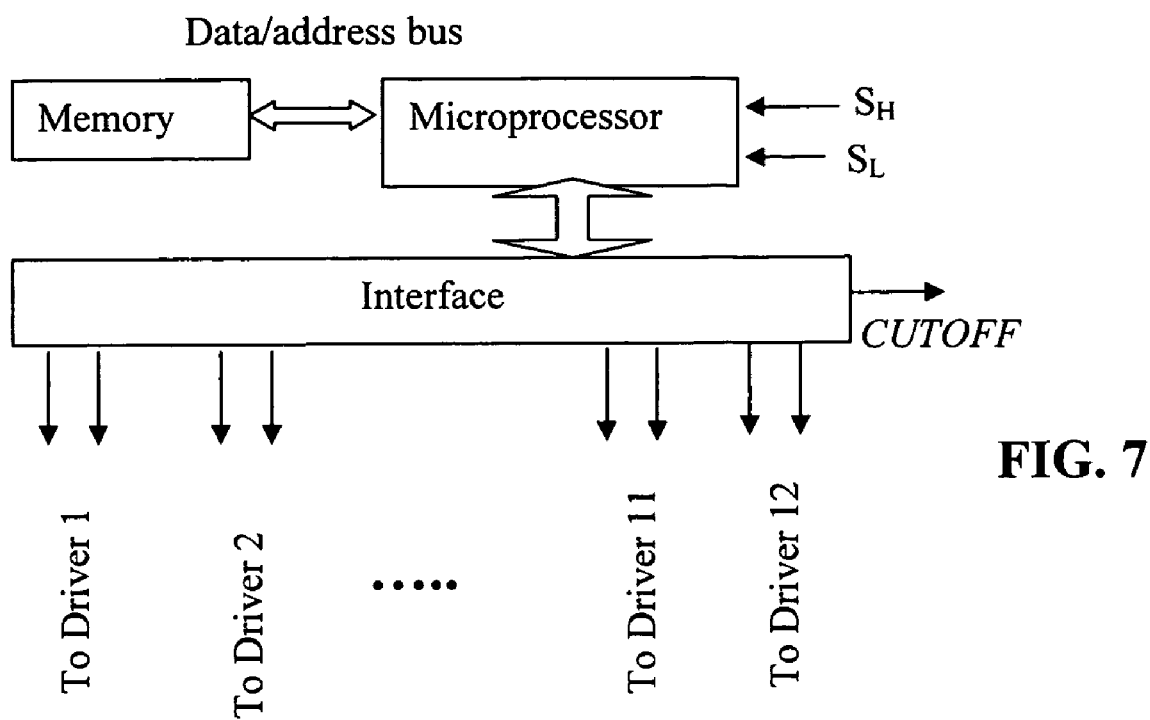
FIG. 7 Schematic of a logic control unit.
Figure 8:
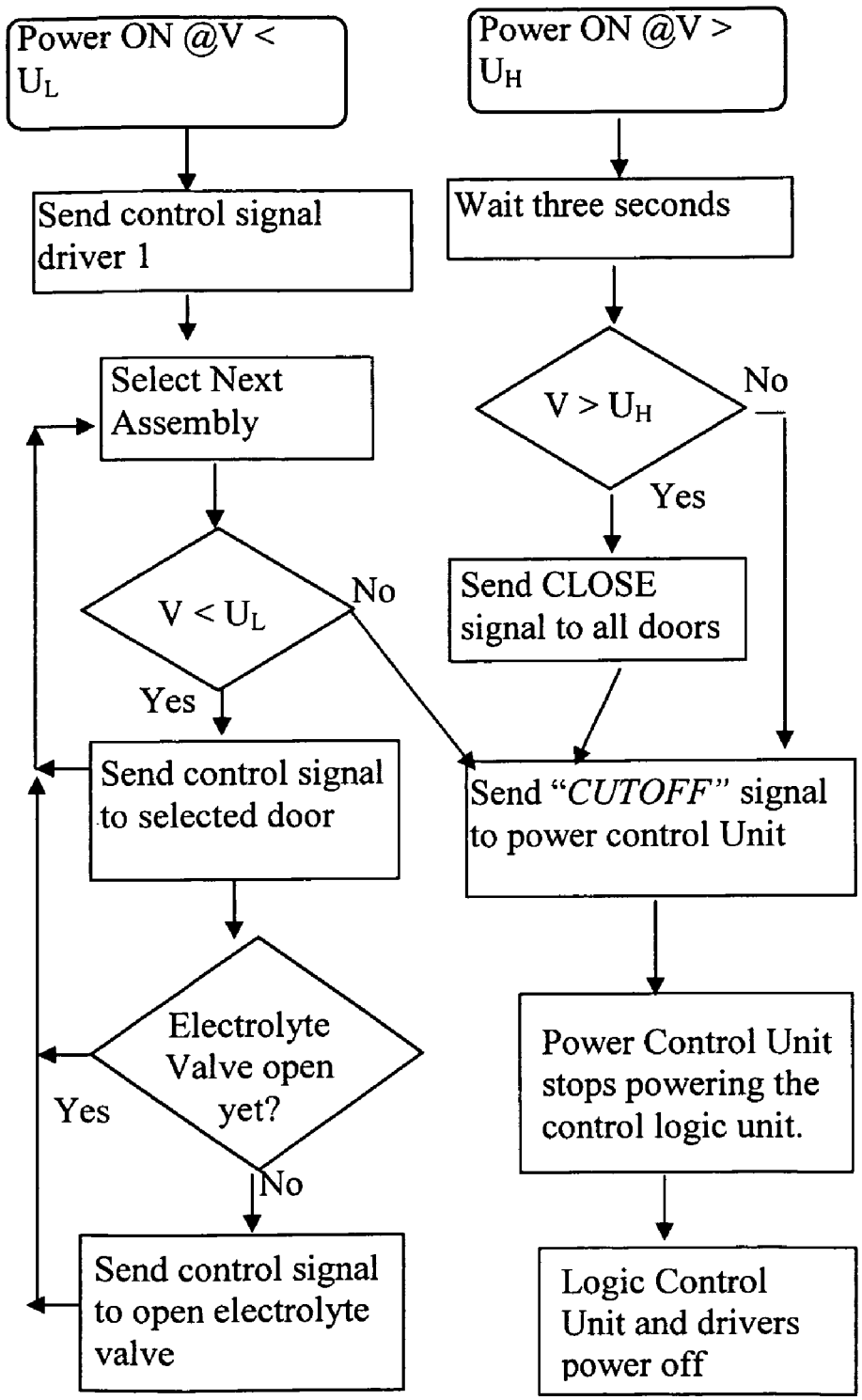
FIG. 8 A block diagram indicating the control logic of FIG. 7.

FIG. 7 shows a more detailed structure of the logic control unit indicated earlier in FIG. 3. The logic control unit preferably consists of a microprocessor, a memory chip, an interface, and data/address buses. The memory stores a program for controlling the electrolyte fluid valve and air vent opening sequence that is shown in FIG. 8. The memory is connected to the microprocessor through a data bus and an address bus. The interface in FIG. 7 sends control signals to different drivers labeled as Driver 1 through Driver 12, each with two lines as a set. One line in each set acts as the $\overline{\text{DriverSelect}}$ function as mentioned in FIG. 6 and the other line acts as the Direction Control function. The interface also sends out "CUTOFF" signal to terminal 16 in the sampling unit as shown in FIG. 4. Two signals labeled $S_H$ and $S_L$ from the sampling unit are accepted by the microprocessor.

FIG. 8 schematically shows a preferred block diagram for the control logic, with the execution instructions of the program stored in the memory chip of FIG. 7. When power is switched on, there will appear two possible conditions based on the design of the sampling unit: either $V<U_L$, or $V>U_H$. Here, V stands for the voltage of the battery, $U_L$ is a predetermined lower limit of the battery voltage, and $U_H$ a predetermined upper limit of the battery voltage. If $U_H \geq V \geq U_L$, power is no longer needed in the control logic system and hence, preferably, this power should be cut off so that the microprocessor stops working in order to conserve energy. If $V<U_L$, the microprocessor in FIG. 7 is powered through the power control unit in FIG. 5, thus allowing the steps specified on the left-hand side of the block diagram in FIG. 8 to proceed. If $V>U_H$, the microprocessor is also powered, allowing the steps on the right-hand side of the block diagram to proceed.

It is to be understood that, even though voltage limits such as $U_L$ and $U_H$ are used as the basis for the criteria in the above description of preferred embodiments, the present invention is not limited to voltage-based criteria for judging if and when a cell assembly should be opened. One could choose to use current, voltage, power, or combinations thereof as a criterion basis.

Figure 9:
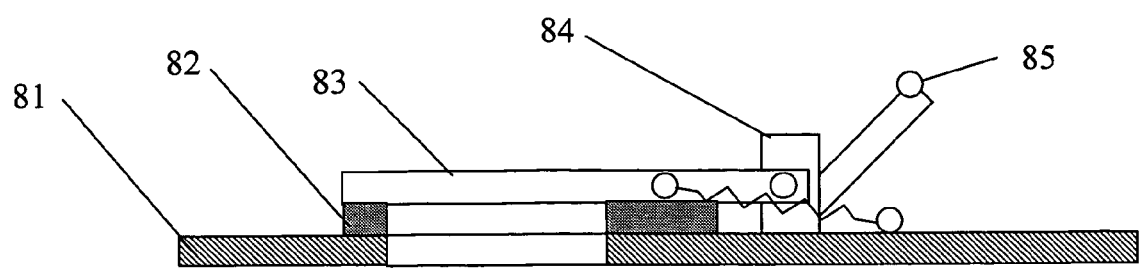
FIG. 9 A rotation-type air vent cover design.
Figure 9:
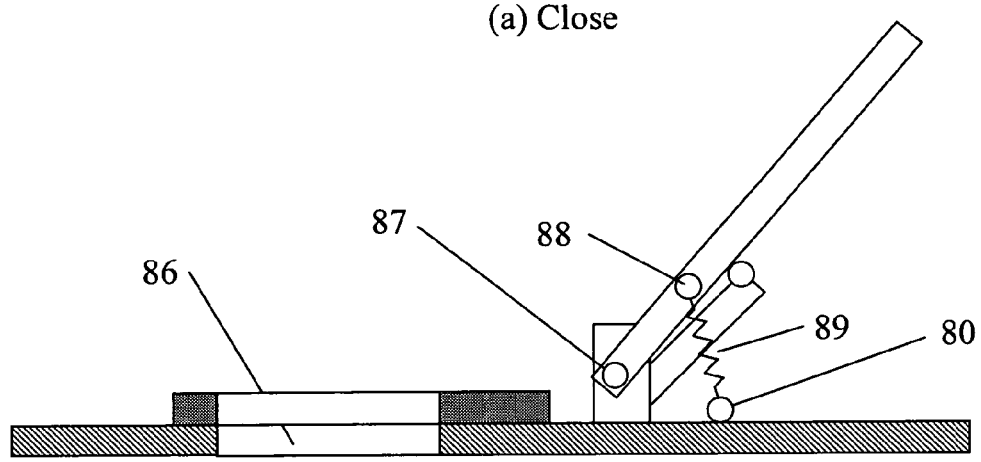

FIG. 9 shows one of the preferred designs for a controllable air vent. An air entrance hole 86 is positioned in the battery casing wall 81. Surrounding the perimeter of the hole 86 is a rubber seal layer 82, which has a hole of approximately the same diameter as that of hole 86. If necessary, a small amount of seal grease may be applied on the surface of the rubber layer 82. The cover 83 is driven by an electromagnetic actuator 87 to rotate around its axis located in the cover stand 84. FIG. 9(*a*) shows the air vent being in a "closed" position and FIG. 9(*b*) an "open" position. A tensioning spring 89 hinges on hooks 88 and 80 to control the cover 83, which can be in two alternate positions: "closed" or "open". A block 85 prevents the cover from moving forward when the cover is being opened.

Figure 10:
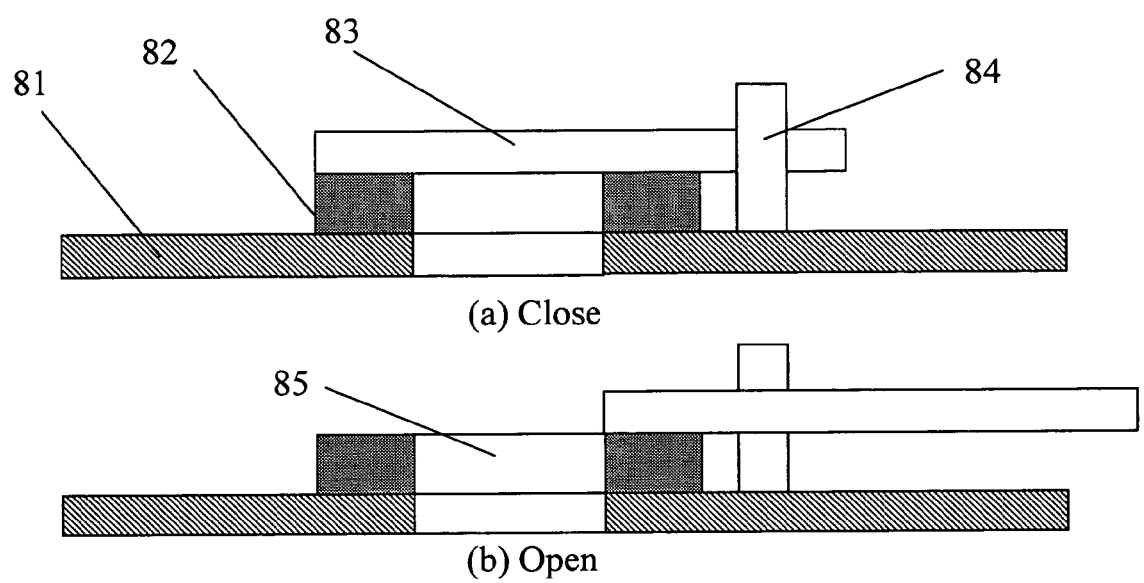
FIG. 10 A sliding-type air vent cover design.

FIG. 10 shows another possible design for a controllable air vent. Again, there is an air entrance hole 85 positioned in the battery casing wall 81 and a rubber seal layer 82 positioned around the perimeter of the air access hole 85. An electromagnetic actuator 87 is used to move the cover 83 between two alternate positions. The "closed" position, shown in FIG. 10(*a*), obstructs the air entrance and the "open" position, FIG. 10(*b*), allows the entry of air into a metal-air assembly. There are many prior art valve or vent designs that are available for use as electrolyte fluid valves or air vents to practice the present invention.

Working Principles:

1. Normal Use (Continuous Use) of a Battery

Before a battery is used, preferably the battery is in one of the following two situations. In the first situation, all the air vents (e.g., D2 to D6, and the main air vent D7 in FIG. 2(B)) are closed except one air vent (e.g., D1 in FIG. 2(B)) is open. To begin the operation of the battery, the cover of the main air vent D7 may be manually switched open, e.g. by poking off the D7 cover with a stick or finger nail. The electrolyte valve to the first metal-air assembly (e.g., Assembly A in FIG. 2(B)) may also be switched open. These two steps will allow electrolyte to flow into cells in the first assembly (e.g., Assembly A in FIG. 2(B)) and outside air to enter inside the battery casing with some air entering the assembly to initiate the battery operation.

In the second situation, all the air vents (e.g., D1 to D6, and the main air vent D7 in FIG. 2) are closed. To begin the battery operation, the electrolyte valve to the first assembly (e.g., for Assembly A) and the primary vent cover is switched open and the cover of the first air vent is also opened, at least slightly, to allow a small amount of air to enter cell assembly A. Thus, cell assembly A will produce a little electric power, but its output voltage may be less than $U_L$, a lower limit predetermined by a battery designer or manufacturer. The sampling unit in FIG. 3 will sense the voltage and send control-driving signals to the power control unit through connection 2 and make the unit work to send power to the logic control unit and drivers through connection 4. Then, the powered logic control unit checks the signals from the sampling unit through connection 1 and carries out an internal calculation and sends control signals to driver 1 through connection 5. The actuator A1 driven by driver 1 acts to fully open the air vent D1 to allow more air into the cell assembly A. After a few seconds, the output voltage will be over $U_L$. The logic control unit will sense it and send a "CUTOFF" signal to the power control unit through connection 6 (see FIG. 3). The power control unit receives the signal and stops supplying the logic control unit and drivers with power. From this moment on, the battery stays in a normal condition to power an outer electric appliance or device.

After a first usage period (e.g., a month or so), the cell assembly A almost runs out of its energy, output power from assembly A can not meet the external demand and the output voltage will drop below $U_L$. The sampling unit will sense the change and inform the power control unit to power up the logic control unit. The logic control unit checks the signals from the sampling unit through connection 1 (see FIG. 3). If the logic control unit determines that the battery output voltage indeed drops below $U_L$, it will send control signals to open the air vent D2. After a few seconds, the output voltage will rise again. If the voltage is over $U_L$, the logic control unit will send a "CUTOFF" signal to the power control unit through connection 6 for turning off the switch in power control unit. From the moment on, the battery stays again in a normal condition to power an external electric appliance or device.

The above procedures are repeated until the electrolyte valve V6 and air vent D6 in FIG. 2(B) are opened and the battery now relies mainly on the cell assembly F to supply the external device with power while the rest of assemblies are trickling out their latest power in parallel. After the battery cannot meet the power demand of the external electric device, it will be thrown away, recharged, or replenished (e.g., with individual cell assemblies replaced with fresh assemblies without discarding the control circuits).

2. Intermittent Use

The initial startup procedure of the battery for the intermittent use is the same as the above described for a continuous use. If the battery is not going to be used for a while (after a previous usage period), according to a preferred embodiment of the present invention, the battery is to close all the six air vents to prevent outer air from entering the cells in order to prolong the service life of the battery. The sampling unit, as shown in FIG. 3, can respond to the power demand change by sensing the voltage fluctuation when an external circuit does not drain any further current from the battery. This would result in a battery output voltage being over $U_H$, a predetermined upper limit defined by battery designers. After the sampling unit detects this voltage fluctuation, it sends a control signal to the power control unit, which instructs to power the logic control unit and all drivers. The powered logic control unit again reads the $S_H$ signal received from the sampling unit through connection 1 to make sure the voltage is still over $U_H$. If it is over $U_H$, the unit will send control signals to all air vent drivers to close the air vents D1 through D6. Then the unit will send a "CUTOFF" signal to the power control unit for cutting off power supply to the logic control unit and all drivers.

After some time, the user may want to re-use the battery again. As such, when the electric appliance is connected to the battery, the output voltage of the battery will drop sharply to below $U_L$ due to no air entering the cells. At this moment, a similar procedure as described above will be initiated to open air vent D1 in FIG. 2(B). After 3 seconds or so, the logic control unit in FIG. 3 will read the signal from the sampling unit through connection 1 and judge whether it is over $U_L$. If it is still below $U_L$, the control unit as shown in FIG. 3 will open D2. After 3 seconds again, if the voltage is still below $U_L$, the unit opens vent D3; these procedures are repeated until the battery provides adequate power and a proper battery voltage output is achieved (e.g., $U_H$). As an extreme case, when these procedures are repeated so that D6 is now open and if the voltage is still below $U_L$ after 3 seconds, the battery needs to be recharged, replenished, or thrown away. When the control unit decides to open an air vent of an assembly, it will also open the electrolyte valve of the assembly if this particular assembly has not been initiated yet and the electrolyte valve is still closed.

Figure 11:
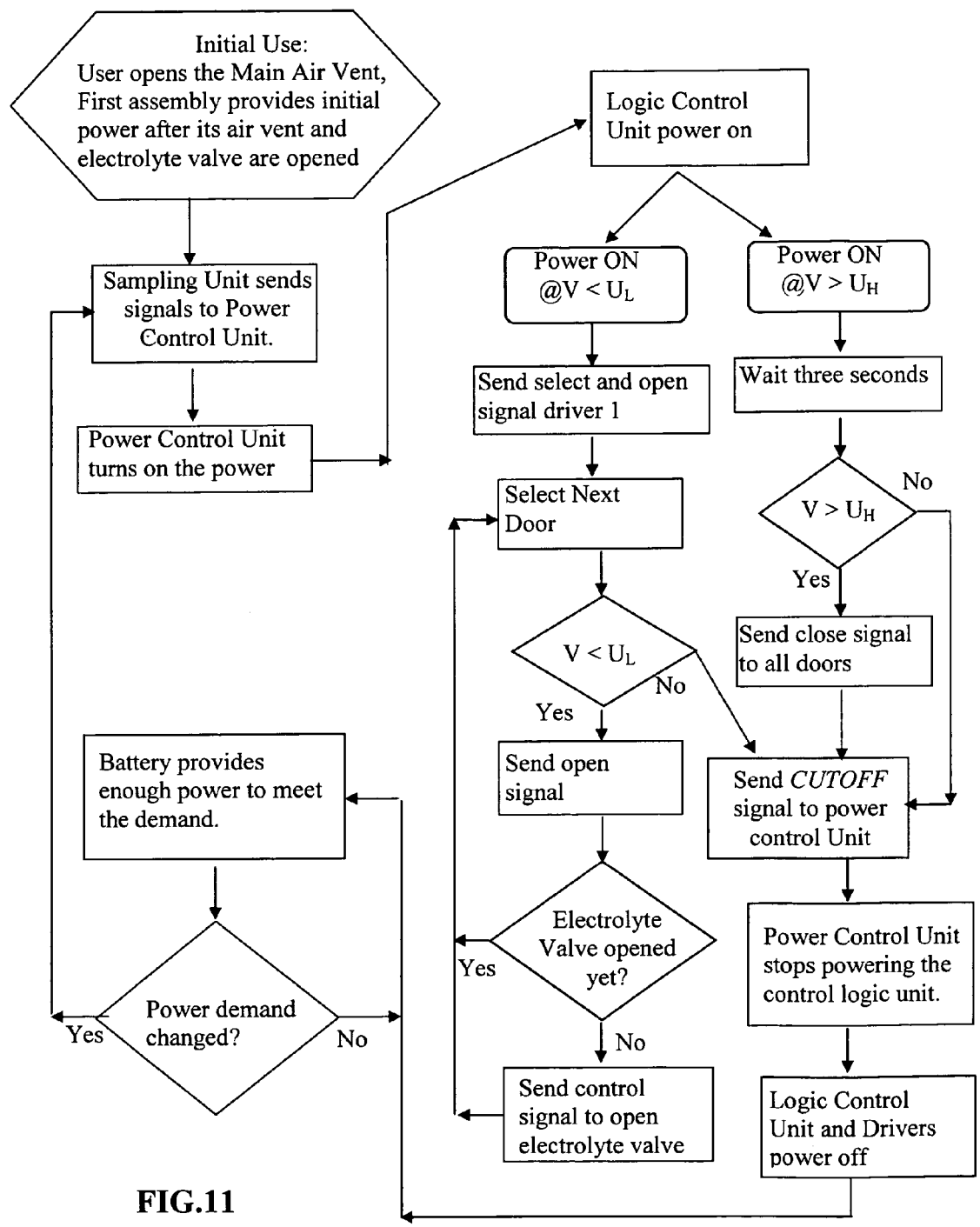
FIG. 11 A flow chart for the operation of the control unit in FIG. 3.

During the operation described above, if the voltage checked by the sampling unit is over $U_L$, the unit will withdraw $S_L$ signal to the logic control unit causing the latter to send a "CUTOFF" signal to power control unit for turning off the power to the logic control unit and all drivers. The battery is now in a normal status of continually supplying the outer electric appliance with power. Shown in FIG. 11 is a flow chart representing the operation of the control unit in FIG. 3.

3. How the Sampling Unit Works

As shown in FIG. 4, resistors R1 and R2 constitute a part of the sampling circuit. The sampling voltage V between R1 and R2 leads to the inverting input of U2 and non-inverting input of U1, where U1 and U2 are voltage comparators. Z1 and Z2 are Zener diodes. When operating under its working condition, a Zener diode maintains a constant voltage drop regardless of change in current. R3 and Z1 constitute a reference voltage circuit to produce $U_H$ mentioned above that is fed to the inverting input of U1. R4 and Z2 constitute a reference voltage circuit to produce $U_L$ mentioned above that is fed to the non-inverting input of U2. If $V<U_L$, the level of the non-inverting input (marked with +) of U2 is greater than its inverting input level. The output of U2, $S_L$, is therefore at the high level. Similarly, if $V>U_H$, the output of U1 becomes high. Terminal 12 carrying signal $S_H$ and terminal 15 carrying signal $S_L$ are fed to the microprocessor in the logic control unit.

4. How the Power Control Unit Works

The power control unit controls the power flowing to the logic control unit and all the drivers from the battery on or off. When either terminal 12 or terminal 15 of the sampling unit raises to a high voltage level, the output terminal of the OR gate in FIG. 5 also goes high and becomes the clock signal to the type D flip flop whose Q terminal raises to high voltage. Thus switch 34 is turned on and electric current flows from 21 to 25. Terminal 16 in FIG. 5 accepts the signal from the logic control unit labeled "CUTOFF" to reset the type D flip flop and return terminal Q to the low voltage level causing the switch to turn off, cutting off the power supply to the logic control units and the drivers.

5. How the Driver Unit Works

The driver unit consists of two NOR gates as shown in FIG. 6. It accepts signals from the logic control unit to power the actuators positively or in reverse to open or close the air vents. Its input signals DirectionControl and $\overline{\text{DriverSelect}}$ come from the logic control unit. Its output terminals 28 and 29 go to the actuators.

6. How the Logic Control Unit Works

The logic control unit is powered under the conditions that the battery voltage $V<U_L$ or $V>U_H$. Once powered, it reads the signal $S_L$ and $S_H$ indicated in FIG. 7. If $S_L$ is high, the interface controlled by the microprocessor will send programmed control signals to drivers of proper cell assemblies marked on FIG. 7 until $S_L$ is at the low level. If the electrolyte valve has not been opened, the unit will send control signals to a valve opener to open up the electrolyte valve and allow electrolyte to contact with the anode material in the assembly. Then, the unit will send a "CUTOFF" signal marked on FIG. 7 to the power control unit.

If $S_H$ is high, it means that no device is connected to the battery to draw current therefrom. The interface will send control signals to all drivers to close all air vents, and then send a "CUTOFF" signal to the sampling unit to cut off the power to the logic control unit and all drivers.

7. How an Air Vent Works

Two examples of air vent designs are shown in FIG. 9 and FIG. 10. The air vent shown in FIG. 9 works by rotation and the air vent in FIG. 10 works by sliding motion. The two air vents are shown to be driven by electromagnetic actuators. The contact interface between the vent cover and the rubber layer may be daubed with some grease to help fully seal the air entrance.

Once the main vent (D7 in FIG. 2(B)) is opened, the first battery usage stage begins. The first cell assembly (e.g., Assembly A with V1 and D1 being open) provides the electric current during this first operating stage of the battery. During this first stage, the fact that all other air vents are closed and all other electrolyte fluids are isolated from their anode active materials serves to eliminate or reduce any potential self-discharge, current leakage, and corrosion problem of the anode active materials in all other cell assemblies (e.g., B through F in FIG. 2) when the first assembly works to provide electricity. This initial stage ends when the anode active material in Assembly A is almost completely consumed or no longer, by itself, capable of providing a desired power level to an external device (e.g., a mobile phone) possibly due to passivation (e.g., the formation of a zinc oxide layer, if any, on a zinc particle) or a change in power demand. At or slightly before this point of time (when it is detected that $V<U_L$), the second assembly (e.g., Assembly B), which was initially closed and protected against the reaction to the anode with electrolyte or oxygen, is now activated by opening air vent D2 and electrolyte valve V2 to admit oxygen and electrolyte into all the metal-air cells in Assembly B. Assembly B, possibly with some help from Assembly A (possibly still providing weak power in parallel), begins to provide electric power to the external device. When assemblies A and B are no longer capable of providing adequate power, a third cell assembly will be activated. Other cell assemblies may be activated at later stages to supply the power as demanded. In this situation, the cell assemblies activated earlier may still be capable of providing electric current, albeit trickling, to the external device. In this manner, the external device can be operated for extended periods of time and all power capacities in all cell assemblies are essentially fully utilized.

For the purpose of illustrating the concepts behind the invented battery, metal-air cells are used as an example. However, the present invention is applicable to all electrochemical cells whose operation depends upon (a) the supply of a gas (whether it is oxygen or not) and/or (b) contact of a liquid electrolyte with an active anode material. In the practice of the present invention, any metal with a negative electromotive force (emf), with reference to hydrogen as a standard, may be used as an anode active material. For metal-air applications, however, it is preferred that the anode active material is a metal or metallic alloy that contains a metal element selected from the group consisting of lithium, magnesium, aluminum, iron, titanium, manganese, nickel, chromium, and zinc. The anode active material in one metal-air cell may be the same as or different from the anode active material in other cells.

The presently invented battery with controlled activation timing achieves one or both of the following two technical goals: (a) a tentative isolation of an anode active material in an un-activated cell from the electrolyte fluid or from both the electrolyte fluid and oxygen so that no significant anode reaction will occur until this cell is needed (e.g., after the battery voltage supplied by other cell assemblies drops below a pre-determined value); and (b) a sustained (intermittent, continuous, or otherwise programmed) use of a battery for an extended period of time.

The present "electrolyte-anode contact on demand" approach is applicable to other batteries than the metal-air. As long as a battery contains an anode to work with a liquid electrolyte, one can design the battery in such a fashion that the electrolyte liquid component will not come in contact with the anode until when a cell or cell assembly is needed. Therefore, another preferred embodiment of the present invention entails an actively controlled battery with a programmed-timing actuation capability, but not based on metal-air cells. This battery comprises a first electrochemical cell assembly, at least a second electrochemical cell assembly electronically connected in parallel with the first assembly, and control means in control relation to the first assembly and the at least second assembly, wherein at least one of the first assembly or second assembly comprises an electrochemical cell comprising an anode active material being initially isolated from an electrolyte fluid through a control valve which is regulated by the control means to open the control valve in a programmed-timing fashion.

Another preferred embodiment of the present invention is an actively controlled battery with a programmed-timing actuation capability, primarily based on electrochemical cells that are not metal-air cells (but could contain one or a few metal-air cells). The battery comprises a first electrochemical assembly, at least a second electrochemical cell assembly electronically connected in parallel with the first assembly, and control means in control relation to the first assembly and the at least second assembly, wherein at least one of the assemblies comprises a metal-air cell. This metal-air comprises a cathode being initially isolated from outside air through a controllable air vent. At least one of the electrochemical cells comprises an anode active material being initially isolated from an electrolyte fluid through a control valve. Both the air vent and control valve are regulated by the control means to open the air vent and control valve in a programmed-timing fashion.

Again, for the purpose of illustrating the utility value of the presently invented battery (containing a number of metal-air cells), the cell design parameters will be provided for a zinc-air battery system, but it must be understood that the present invention is not limited to this particular type of cell. The theoretical energy density ratio of zinc can be calculated by using physical property values readily available in physics textbooks. Zinc has a density of 7.13 g/cm$^3$ and an atomic concentration of $6.55 \times 10^{22}$ atoms/cm$^3$. Each zinc atom will give up two electrons, hence there will be $(2 \times 6.55 \times 10^{22})$ electrons per cm$^3$ or 7.13 grams of zinc. Since there are $1.6 \times 10^{-19}$ coulombs per electron, we have $(2 \times 6.55 \times 10^{22}) \times (1.6 \times 10^{-19})/7.13 = 2,940$ Coulomb/gram.

But, this charge amount is available at 1.2 volts, hence the energy density in watt-hours per kilogram is: $2,940 \times 1.2 \times 1000/3,600 = 980$ watt-hours/kilogram. The results of similar calculations for other selected metals intended for use in a metal-air battery are summarized in Table 3, where the working voltages used in the calculations were approximate values.

TABLE 3

Summary of energy density calculation results for selected metal elements.

| Metal | Atomic mass, g/mole | Density g/cm$^3$ | Valency | Est. working voltage, V | Atoms/cm$^3$ ($\times 10^{22}$) | Atoms/g ($\times 10^{22}$) | Coul./g | Watt-hours/Kg |
|---|---|---|---|---|---|---|---|---|
| Li | 6.94 | 0.534 | 1 | 3.4 | 4.63 | 8.67 | 13,879 | 13,108 |
| Mg | 24.312 | 1.738 | 2 | 2.7 | 4.30 | 2.48 | 7,923 | 5,943 |
| Al | 26.981 | 2.699 | 3 | 2 | 6.02 | 2.23 | 10,710 | 5,950 |
| Ti | 47.9 | 4.507 | 2 | 2 | 5.66 | 1.26 | 4,022 | 2,234 |
| Mn | 54.938 | 7.47 | 2 | 2 | 8.18 | 1.10 | 3,506 | 1,948 |
| Zn | 65.38 | 7.133 | 2 | 1.2 | 6.57 | 0.92 | 2,947 | 982 |
| Cr | 51.996 | 7.19 | 3 | 1.15 | 8.32 | 1.16 | 5,557 | 1,775 |
| Fe | 55.847 | 7.87 | 2 | 0.8 | 8.48 | 1.08 | 3,449 | 766 |
| Ni | 58.71 | 8.902 | 2 | 0.65 | 9.13 | 1.02 | 3,281 | 592 |

Despite a reasonably high energy density for zinc, current commercial zinc-air batteries have achieved only 150 watt-hours per kilogram. There are two principal factors that contributed to the reduction in energy density. The first is the overhead weight which includes the weights of the external case, electrolyte, and wires. The second is that only the zinc surface is involved in the chemical reaction. Specifically, just like all other metal-air batteries, current zinc-air batteries suffer from the problem of "passivation" by the formation of a zinc oxide layer that prevents the remaining anode active material (Zn) from contacting the electrolyte. There are also problems such as self-discharge or current leakage. In other words, not all Zn atoms are fully utilized in providing electrons to the external device. Earlier attempts to prevent degradation of battery performance caused by zinc oxide passivation involved adding a sufficient (usually excessive) amount of electrolyte to allow most of the zinc to dissolve. However, the large amount of electrolyte added to the cell significantly increased the total weight of the battery system, thereby compromising the energy density.

Recent efforts have focused on the development of fine powder based Zn anodes. Anodes are made by compacting powdered zinc onto brass current collectors to form a porous mass with a high surface/volume ratio. In this configuration, the oxide does not significantly block further oxidation of the zinc provided that the zinc particles are sufficiently small. With excessively small zinc particles, however, all zinc particles could be rapidly consumed and the battery will not last long. An optimum zinc particle size for a particular Zn-electrolyte combination must be carefully determined in order for the zinc-air battery to function as a long lasting power source. Alternatively, very thin sheets of zinc may be used as an anode active material.

Example 1

Control Sample

To further illustrate the battery design concepts inherent in the present invention, let us use a current zinc-air battery (Model EF-M2-33 for use in Motorola StarTAC mobile phone) as an example. The battery is rated at a power capacity of 3300 mAh×3.6 v=11.88 watt-hours. The battery is designed to provide a "talk time" of 6-16 hours or "stand-by" time of 80-350 hours (3.33-14.6 days). With an energy density of 980 watt-hours/Kg for Zn, this capacity requires at least 12.1 grams of Zn (i.e., 11.88/980=0.0121 Kg). In actuality, much more Zn was used in this commercially available battery. The total weight of this battery (Zn plus overhead weights) is rated at 79 grams.

In order to extend the "stand-by" time to 30 days, an approximate Zn anode amount of 25 grams will be required, provided that all 25 grams of Zn is fully utilized. Unfortunately, by simply doubling the amount of unprotected Zn in anode did not double the "stand-by" time, presumably due to the problems of passivation, current leakage, and self-discharge (e.g., through direct ZnO formation in the electrolyte without providing electrons to the external device, the mobile phone).

Example 2

In accordance with the present invention, a new Zn-air battery was designed in such a way that the first 12 grams of Zn, in a fine powder form (average particle size of 8-20 μm), was packed together and attached to a copper-based current collector. This first 12 grams of Zn in contact with the KOH electrolyte (just like in a conventional Zn-air cell) was packed in a first cell assembly and provides the first 14 days of stand-by time to a mobile phone. This first 12 grams of Zn in the present invention is referred to as the "initial-stage" anode active material. The next 13 grams of Zn, also in the form of fine particles but initially isolated from KOH solution, was used in the second cell assembly and got activated after slightly less than 14 days (allowing KOH solution to come in contact with the Zn particles). These 13 grams of Zn provided approximately 15.5 days of stand-by time, making the total stand-by time now up to 29.5 days. This was possible due to the fact that, with the controlled-timing activation, it iwa less likely to have self-discharge or current leakage associated with this extra 13 grams of Zn. This was achieved by adding 13 grams of Zn, plus additional 13 grams of overhead materials (extra electrolyte, slightly more casing material, etc.), to the total weight of the battery. With a total battery weight of (79+26=105 grams) providing a power of 24 watt-hours, the over-all battery energy density is now (24/0.105=228 watt-hours/Kg), which reflects a major improvement from (11.88/0.079=150 watt-hours/Kg). By incorporating additional amounts of anode active Zn in other cell assemblies designed to be activated at much later times, a battery providing a mobile phone stand-by time of two or three months with an over-all energy density of better than 400 watt-hours is now possible.

Example 3

Again, 12 grams of Zn was used as the first-stage anode active material and additional 13 grams of Zn was used as the second-stage anode active material, as in the above Example 2. In the present Example 3, however, the second-stage anode material was initially isolated from KOH solution and air was not admitted into the cell during the first stage. At the end of the first 14 days, KOH was allowed to flow into the anode compartment and air was admitted into the cell. These extra 13 grams of Zn were found to provide up to approximately 16.5 days of operation. The fact that the controlled-timing activation functions to expose an anode active material to the electrolyte liquid and oxygen at the correct timing with the purpose of protecting an anode active material against corrosion, passivation, and self-discharge makes this class of exceptionally long operating life batteries technically feasible and economically viable.

What is claimed is:

1. An actively controlled battery with a programmed-timing actuation capability, said battery comprising:

(a) a first metal-air cell assembly and at least a second metal-air cell assembly electronically connected in parallel, wherein said first cell assembly comprises at least a first metal-air cell comprising an active anode enclosed in an anode compartment, an air cathode, a first air access vent, a separator separating said anode from said cathode, a reservoir containing an electrolyte fluid therein, and a first controllable fluid valve being in flow communication with said electrolyte fluid reservoir on one side and in control relation to said anode compartment on another side; said first air access vent and said first fluid valve being closed during a battery storage period and being opened, at the first use of said battery, to admit outside air into said cathode and to allow an electrolyte fluid to enter said anode compartment to come in contact with said anode therein for activating an operation of said first metal-air cell assembly; and said second cell assembly comprises at least a second metal-air cell comprising a second active anode enclosed in a second anode compartment, a second air cathode, a second air access vent, a second separator separating said second anode from said second cathode, a second reservoir containing an electrolyte fluid therein, and a second controllable fluid valve being in flow communication with said second electrolyte fluid reservoir on one side and in control relation to said second anode compartment on another side; said second air vent and said second fluid valve being closed during a battery storage period and being opened in response to a programmed signal to admit outside air into said second cathode and to allow an electrolyte fluid to enter said second anode compartment to come in contact with said second anode therein for activating an operation of said second metal-air cell assembly; and (b) control means in control relation to at least said second cell assembly for sending programmed signals to open up at least said second air vent and said second controllable fluid valve in a programmed fashion.

2. The battery as set forth in claim 1, wherein said first cell assembly comprises at least another electrochemical cell which is electronically connected in series or in parallel to said first metal-air cell.

3. The battery as set forth in claim 1, wherein said second cell assembly comprises at least another electrochemical cell which is electronically connected in series or in parallel to said second metal-air cell.

4. The battery as set forth in claim 2, wherein said another electrochemical cell is a metal-air cell.

5. The battery as set forth in claim 3, wherein said another electrochemical cell is a metal-air cell.

6. The battery as set forth in claim 1, wherein said first air access vent and/or second air access vent are/is closed when said battery is not in operation.

7. The battery as set forth in claim 1, wherein said first controllable fluid valve, second controllable fluid valve, first air access vent, or/and second air access valve is equipped with actuator means operative to open said first valve, second valve, first vent, or/and second vent responsive to programmed signals from said control means.

8. The battery as set forth in claim 7, wherein said actuator means comprises an actuator element selected from the group consisting of a bi-metal device, a thermo-mechanical device, a piezo-electric device, a shape memory alloy, an electromagnetic element, or a combination thereof.

9. The battery as set forth in claim 1, wherein said control means comprises a sampling unit and a logic circuit to determine the timing at which a controllable valve is opened.

10. The battery as set forth in claim 9, further comprising a power-control unit to regulate a power input to said logic circuit and wherein said power input is switched off to conserve battery power after said control unit determines that no opening or closing of any of said fluid valves or said air vents is needed.

11. The battery as set forth in claim 1, wherein at least said second controllable fluid valve and said second air vent are opened when a voltage, current, or power output of said battery, when in use, drops to below a predetermined low threshold voltage, current, or power.

12. The battery as set forth in claim 7, further comprising an auxiliary power source to power an actuator means for opening said first controllable fluid valve and/or first air vent.

13. The battery as set forth in claim 7, wherein at least one of said controllable air vents is re-closeable and is re-closed responsive to a programmed signal from said control means.

14. The battery as set forth in claim 7, wherein at least one of said air vents is re-closed when a voltage, current, or power output of said battery exceeds a predetermined high threshold voltage, current, or power.

15. The battery as set forth in claim 1, wherein said programmed fashion comprises a mode of sequential timing at which said controllable fluid valves are opened in a sequential fashion.

16. The battery as set forth in claim 1, wherein said programmed fashion comprises a mode of sequential timing at which said air vents are opened or closed in a predetermined sequential fashion.

17. The battery as set forth in claim 1, further comprising a main casing to house said at least first and second cell assemblies.

18. The battery as set forth in claim 17, wherein said main casing comprises an air vent which is closed during an initial battery storage period and is opened manually to begin an operation of said battery.

19. The battery as set forth in claim 9, wherein said control means determines said timing based on a real time voltage, current or power requirement.

20. The battery as set forth in claim 1, wherein said first anode compartment and/or second anode compartment contains therein an electrolyte powder ingredient.

21. The battery as set forth in claim 1, wherein said first anode and/or second anode comprises a metal element selected from the group consisting of lithium, magnesium, aluminum, zinc, titanium, chromium, manganese, iron, and cadmium.

22. The battery as set forth in claim 1, further comprising at least an additional electrochemical cell assembly electronically connected in parallel with said first metal-air assembly, wherein said at least an additional electrochemical cell assembly contains no metal-air cell.

23. The battery as set forth in claim 1, wherein said control means are further in control relation to said first cell assembly for sending programmed signals to open up said first air vent and said first controllable fluid valve in a programmed fashion.

* * * * *